United States Patent
Busnoult (10) Patent No.: US 9,726,774 B2
(45) Date of Patent: Aug. 8, 2017

(54) SYSTEM AND METHOD FOR CONTROL OF MARINE SEISMIC STREAMER DURING MAINTENANCE

(71) Applicant: Sercel SA, Carquefou (FR)

(72) Inventor: Frédéric Busnoult, La Chapelle sur Erdre (FR)

(73) Assignee: SERCEL SA, Carquefou (FR)

( * ) Notice: Subject to any disclaimer, the term of this patent is extended or adjusted under 35 U.S.C. 154(b) by 364 days.

(21) Appl. No.: 14/445,514

(22) Filed: Jul. 29, 2014

(65) Prior Publication Data

US 2016/0033662 A1    Feb. 4, 2016

(51) Int. Cl.
*G01V 1/38*   (2006.01)

(52) U.S. Cl.
CPC .................. *G01V 1/3826* (2013.01)

(58) Field of Classification Search
None
See application file for complete search history.

(56) References Cited

U.S. PATENT DOCUMENTS

| | | | | |
|---|---|---|---|---|
| 5,615,170 A | * | 3/1997 | Chelminski | G01V 1/137 181/120 |
| 2003/0208320 A1 | * | 11/2003 | Zajac | G01V 1/3826 702/14 |
| 2009/0204274 A1 | * | 8/2009 | Bittleston | G01V 1/3826 700/302 |
| 2010/0226204 A1 | * | 9/2010 | Gagliardi | G01V 1/38 367/16 |
| 2014/0204705 A1 | * | 7/2014 | Tonchia | G01V 1/3826 367/17 |

(Continued)

FOREIGN PATENT DOCUMENTS

| | | |
|---|---|---|
| EP | 1 047 958 | 7/1999 |
| EP | 2 703 850 A2 | 3/2014 |
| EP | 2 759 853 A2 | 7/2014 |

(Continued)

OTHER PUBLICATIONS

Search Report in corresponding Great Britain Application No. GB1512089.2 dated Jan. 8, 2016.

*Primary Examiner* — Miranda Huang
*Assistant Examiner* — Jason Lin
(74) *Attorney, Agent, or Firm* — Patent Portfolio Builders PLLC (57) ABSTRACT

A method of controlling a marine seismic streamer towed by a vessel includes deploying a workboat next to a section of the streamer and receiving, at the vessel, from the workboat, a command to enter a maintenance mode. In response, a locking command is transmitted via a streamer data link to direct a bird attached to the streamer to lock movable surfaces thereof. A user interface on the vessel is locked so that control of the bird is no longer available therethrough. A control apparatus for marine seismic operations includes the user interface, a receiver to receive commands from the workboat, a streamer interface to command the birds, a memory recording locations and identifiers of the birds, and a processor configured to carry out the method steps. A marine seismic detection system includes the streamer, a maintenance controller in the workboat, and an integrated navigation system controller in the vessel.

20 Claims, 8 Drawing Sheets

(56) References Cited

U.S. PATENT DOCUMENTS

2014/0239171 A1* 8/2014 Platt .................. H01J 49/26
  250/282
2014/0321238 A1* 10/2014 Winfield .............. G01V 1/3826
  367/17

FOREIGN PATENT DOCUMENTS

| EP | 2 775 325 A1 | 9/2014 |
|----|--------------|--------|
| GB | 2505778 A | 3/2014 |
| WO | 99/34238 A1 | 7/1999 |

* cited by examiner

SYSTEM AND METHOD FOR CONTROL OF MARINE SEISMIC STREAMER DURING MAINTENANCE

BACKGROUND

Technical Field

Embodiments of the subject matter disclosed herein generally relate to marine seismic acquisition systems, devices and methods, and more specifically to control of such systems for maintenance purposes.

Discussion of the Background

Seismic waves generated artificially for the imaging of geological layers have been used for many years. Reflection seismology is a method of geophysical exploration used to determine the properties of a portion of a subsurface layer in the earth, which information is especially helpful in the oil and gas industry. Marine-based seismic data acquisition and processing techniques are used to generate a profile (image) of a geophysical structure (subsurface) of the strata underlying the seafloor. While this profile does not necessarily precisely pinpoint the exact location of oil or gas reservoirs, it may suggest, to those trained in the field, the presence or absence of oil or gas reservoirs.

The overall seismic acquisition process includes generating seismic waves (i.e., sound waves) directed toward the subsurface area, gathering data associated with reflections of the generated seismic waves at interfaces between the layers of the subsurface, and analyzing the data to generate a profile (image) of the geophysical structure, i.e., the layers of the investigated subsurface. This type of seismic acquisition or exploration can be used both on the subsurface of land areas and for exploring the subsurface of the ocean floor.

Marine reflection seismology is based on the use of a controlled source that sends energy waves into the earth by first generating the energy waves in or on the ocean. By measuring the time it takes for the reflections to come back to one or more receivers (usually quite a few reflections, perhaps on the order of several dozen, or even hundreds), it is possible to estimate the depth and/or composition of the features causing such reflections. These features may be associated with subterranean hydrocarbon deposits.

One of the ways to perform marine seismic acquisitions or surveys is to tow an array of acoustic sources and receivers, some or both of which may be disposed on elongated streamers, by a vessel over the geographical area of interest (GAI) and to generate source signals and receive corresponding reflections while traversing the GAI. This process is sometimes referred to by those skilled in the art as "shooting" a GAI or cell being surveyed.

As marine seismic surveying has increased in sophistication, it has become possible to tow more sources and receivers behind a single vessel. Streamers can now be up to 16 km long, towed at approximately 5 kt, 10 m below the ocean surface. As streamers are generally neutrally buoyant, it is desirable to actively correct deviations of the streamers at the proper depth or course. The streamer therefore has "birds" arranged at intervals thereon. The birds are controlled from a dedicated system, by a streamer operator generally located in the tow vessel. The birds include "wings" (or fins or other control surfaces) movable to move the streamer both vertically (diving or surfacing) and horizontally ("lateral steering"). The birds and are other equipment attached to the streamer are generally not negatively buoyant, so it is desirable to maintain speed even if an element of a streamer, e.g., a seismic receiver, needs to be repaired so that the entire streamer floats. As used herein, the term "maintenance" encompasses repairs, cleaning, or other work performed by maintenance personnel or robots to restore a non-functional or less-than-fully-functional streamer to full functionality, or to forestall loss of functions of a streamer.

In order to maintain (e.g., repair or clean) the streamer, the birds in a portion of the streamer needing repair are controlled to surface that portion of the streamer while the remainder of the streamer stays submerged. A workboat is then dispatched from the towing vessel or a support vessel to make repairs on the surfaced section. The workboat generally includes a mounting fixture that grips a portion of the streamer while repairs are being made. However, the birds or the streamer itself can pose hazards to the workboat or workboat personnel. For example, if the birds are commanded to dive while the workboat is gripping the streamer, the workboat can be tipped or workboat personnel can be pulled or knocked overboard. Moreover, if a bird or streamer section adjacent to a bird is under repair, motion of the bird wings while it is being repaired can injure personnel or damage the workboat.

Prior schemes for mitigating these hazards require the streamer operator to transmit a "lock" command to the relevant birds to prevent motion of their wings for the duration of the work. However, this relies on the streamer operator to correctly command the birds, and requires that effective communications be possible between the workboat personnel and the streamer operator. Accordingly, there is a continuing need for ways of mitigating bird-related hazards during streamer maintenance.

BRIEF DESCRIPTION

According to an embodiment, there is a method of controlling a marine seismic streamer towed by a vessel, the method including deploying a workboat next to a selected section of the streamer; receiving, at the vessel, from the workboat a start command to enter a maintenance mode; and in response to the received start command: transmitting a locking command via a data link located in the streamer to direct a first one of the birds attached to the streamer to lock movable surfaces thereof; and locking a user interface on the vessel so that control of the first one of the birds is no longer available via the user interface.

According to another embodiment, there is a control apparatus for marine seismic operations, the control apparatus including: a user interface; a receiver configured to receive commands from a companion transmitter in a marine seismic workboat; a streamer interface configured to transmit commands to birds on a streamer configured to be towed by a marine seismic vessel; a memory configured to record locations and identifiers of the birds; and a processor configured to: via the user interface, receive an indication of a location on the streamer; select one(s) of the birds on the streamer having recorded locations proximal to the indicated location; and, via the receiver, receive lock or unlock commands from the workboat and, in response, transmit respective lock or unlock commands via the streamer interface to the selected one(s) of the birds, and respectively lock or unlock the user interface.

According to yet another embodiment, there is a marine seismic detection system including a marine seismic streamer configured to be towed by a vessel, the streamer having a data link and one or more bird(s), each of the bird(s) including one or more movable surface(s) configured to assist in positioning the streamer; a maintenance controller configured to be installed in a workboat, the maintenance controller including a maintenance user interface configured to receive a start-maintenance command and a stop-maintenance command, and including a transmitter (TX) responsive to the maintenance user interface to transmit an indication of the received command via a remote-communication link; and an integrated navigation system (INS) controller configured to be installed in a vessel, the INS controller including a processor configured to automatically: in response to receipt via the remote-communication link of the indication of the start-maintenance command, operate the data link to direct a first one of the bird(s) to immobilize the movable surface(s) thereof, and disable an INS user interface; and, in response to receipt via the remote-communication link of the indication of the stop-maintenance command, operate the data link to direct the first one of the bird(s) to operate the movable surface(s) thereof normally, and enable the INS user interface.

BRIEF DESCRIPTION OF THE DRAWINGS

For a more complete understanding of the present invention, reference is now made to the following descriptions taken in conjunction with the accompanying drawings, in which.

DETAILED DESCRIPTION

The following description of the exemplary embodiments refers to the accompanying drawings. The same reference numbers in different drawings identify the same or similar elements. The following detailed description does not limit the invention. The following embodiments are discussed, for simplicity, with regard to the terminology and structure of towed marine seismic survey devices. However, the embodiments discussed are not limited to that configuration, but may be used in other types of seismic surveys.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Throughout this description, some embodiments are described in terms that would ordinarily be implemented as software programs. Those skilled in the art will readily recognize that the equivalent of such software can also be constructed in hardware, firmware, micro-code, or combinations of these with each other or with software. Given the systems and methods as described herein, software not specifically shown, suggested, or described herein that is useful for implementation of any embodiment is conventional and within the ordinary skill in such arts.

Figure 1:
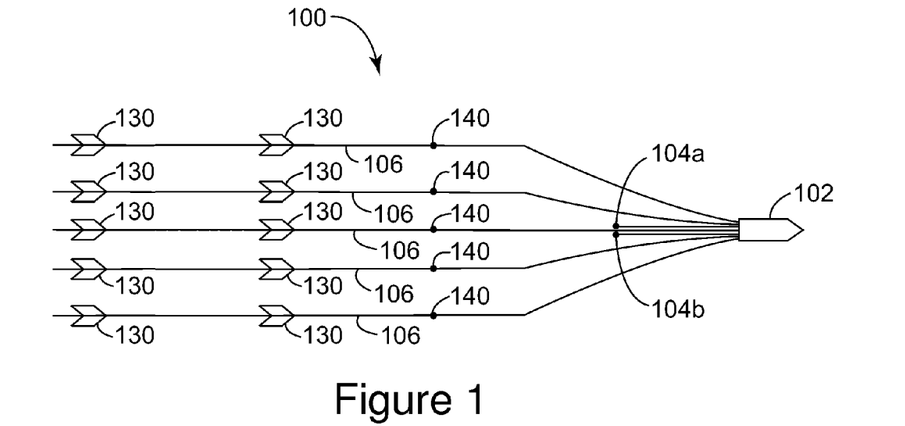
FIG. 1 is a top schematic view of an exemplary marine seismic acquisition or exploration system.

FIG. 1 shows an exemplary seismic acquisition system 100 including a vessel 102 towing plural streamers 106 that may extend over kilometers behind vessel 102. Each of the streamers 106 can include one or more birds 130 that maintain the streamer 106 to which they are attached in a known and controllable position relative to other streamers 106. As noted above, the birds 130 are capable of moving streamers 106 as desired according to communications or commands which birds 130 receive from vessel 102. Birds 130 are controlled by streamer control system 103. One or more sources (or source arrays) 104a, 104b (referenced individually or collectively by reference number 104) may also be towed by vessel 102 (or another vessel, not shown) for generating seismic waves. Sources 104 can be placed either in front of or behind the receivers 140 which are attached to the streamers 106, or both behind and in front of receivers 140. Each of the streamers 106 can include one or more receivers 140; for simplicity, only one receiver 140 is shown per streamer 106. The seismic waves generated by sources 104 propagate downwardly, and either reflect off or penetrate the seafloor. The penetrating waves eventually are reflected by one or more reflecting structures (not shown) which are disposed in the seafloor subsurface back toward the surface. The reflected seismic waves propagate upwardly and are detected by receivers 140 provided on streamers 106.

Figure 2:
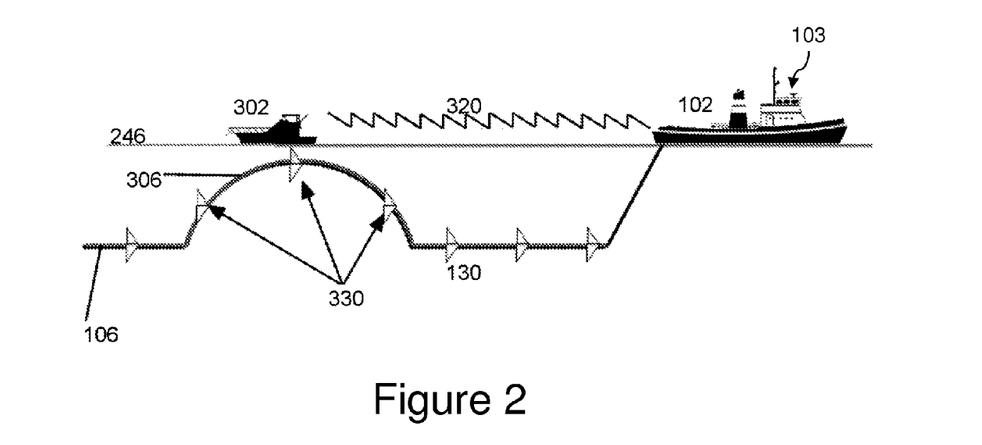
FIG. 2 is an exemplary side elevation of a marine seismic ship, a workboat, and a streamer during maintenance.

FIG. 2 shows an exemplary streamer 106 configured for maintenance. Vessel 102 tows streamer 106 with birds 130, as discussed above. Birds 330 have been commanded to rise and carry portion 306 of streamer 106 with them. As a result, at least part of portion 306 is accessible by personnel on the workboat 302. Workboat 302 and vessel 102 communicate via, e.g., remote-communication link 320. The remote-communication link 320 can include, e.g., a wireless link outside the streamer 106. In one embodiment, workboat 302 communicates with vessel 102 through a data link (to be discussed later) that is used for transmitting the seismic data from the sensors to the vessel. For this embodiment, the workboat's operator first connects the workboat to the streamer, for example, using inductive means, to be able to communicate with the data link. In another application, the workboat's operator can first detach the bird from the streamer and use the bird's connection to the data link to communicate with the vessel.

Figure 3:
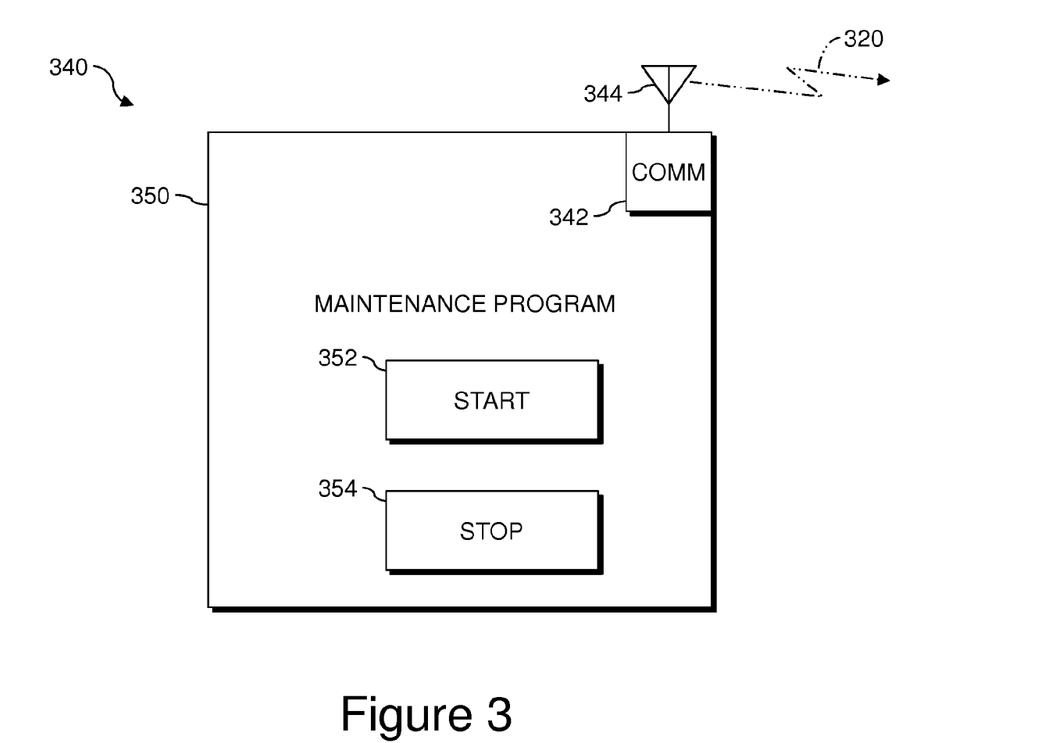
FIG. 3 illustrates an exemplary interface available on a workboat for maintenance operations, together with related components.

FIG. 3 shows a control device 340 installed on the workboat 302 and configured to communicate with the vessel 102. Control device 340 includes a communication device 342 (e.g., a transceiver or transmitter) that uses an antenna 344 for establishing the remote-communication link 320. Communication device 342 is connected to a maintenance user interface 350, e.g., on a touchscreen, that may be used by personnel on the workboat 302 for taking control (partial or total) of the streamer control system 103. In its simplest form, maintenance user interface 350 displays two buttons, a start button 352 for starting the maintenance process, during which the operator of the vessel 102 loses control of the birds 130, 330, and a stop button 354 for terminating the maintenance process, at which point the operator of the vessel 102 regains control of the birds 130, 330. In an example, start button 352 and stop button 354 are physical buttons. In another example, start button 352 represents the depressed position of a conventional emergency-stop button, and stop button 354 represents the non-depressed position of the emergency-stop button. As will be discussed later, only a part of (e.g., some of) the birds 130, 330 may be controlled by this maintenance user interface 350. As also will be discussed later, maintenance user interface 350 may be more complex, so that full control of the streamer control system may be available from the workboat 302. As will be recognized by those skilled in the art, maintenance user interface 350 may include any number of the features available on the vessel 102 for controlling the streamers 106 or birds 130, 330 or other devices thereon.

Figure 4:
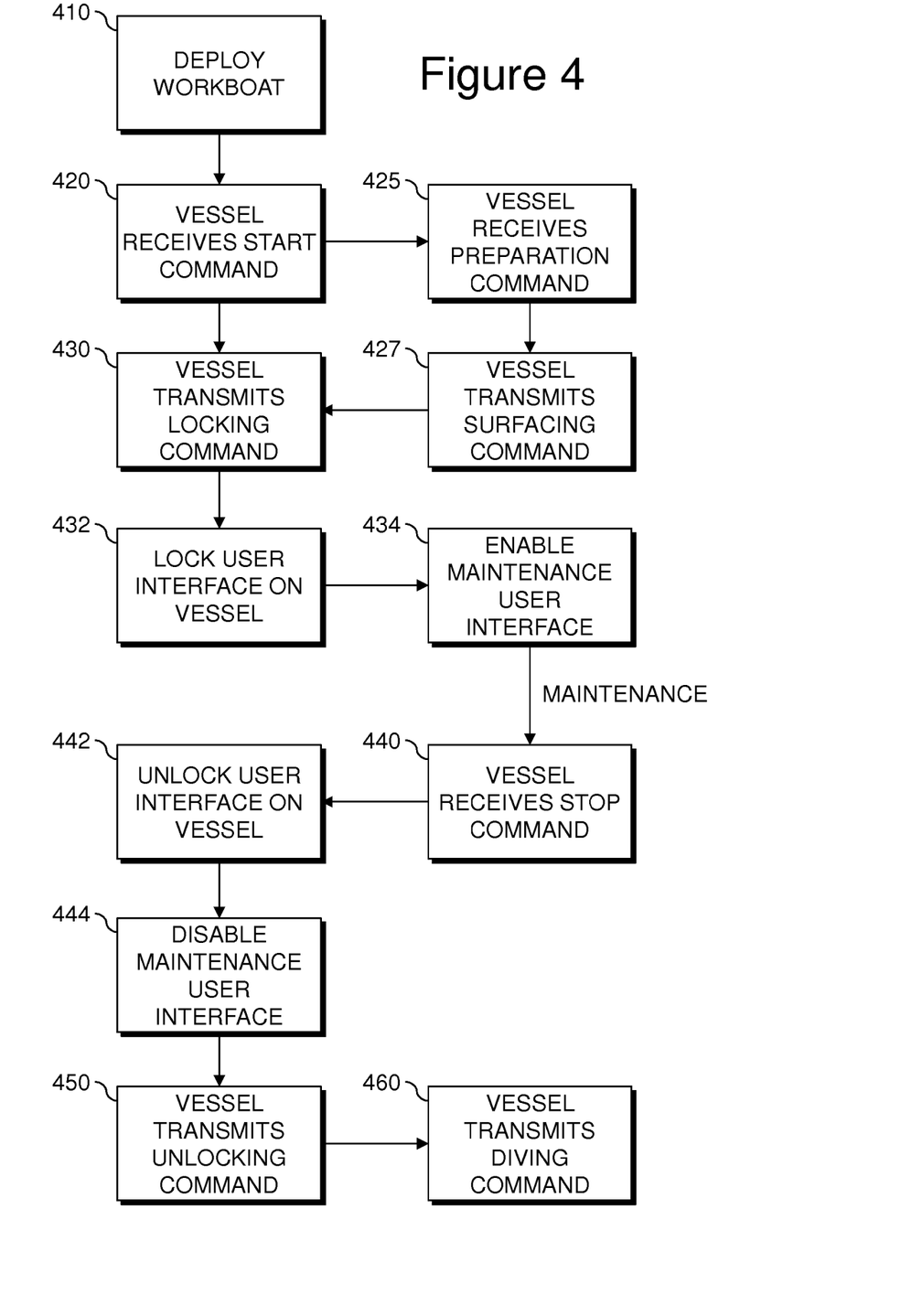
FIG. 4 is a flowchart illustrating exemplary methods for controlling a marine seismic streamer towed by a vessel.
Figure 8:
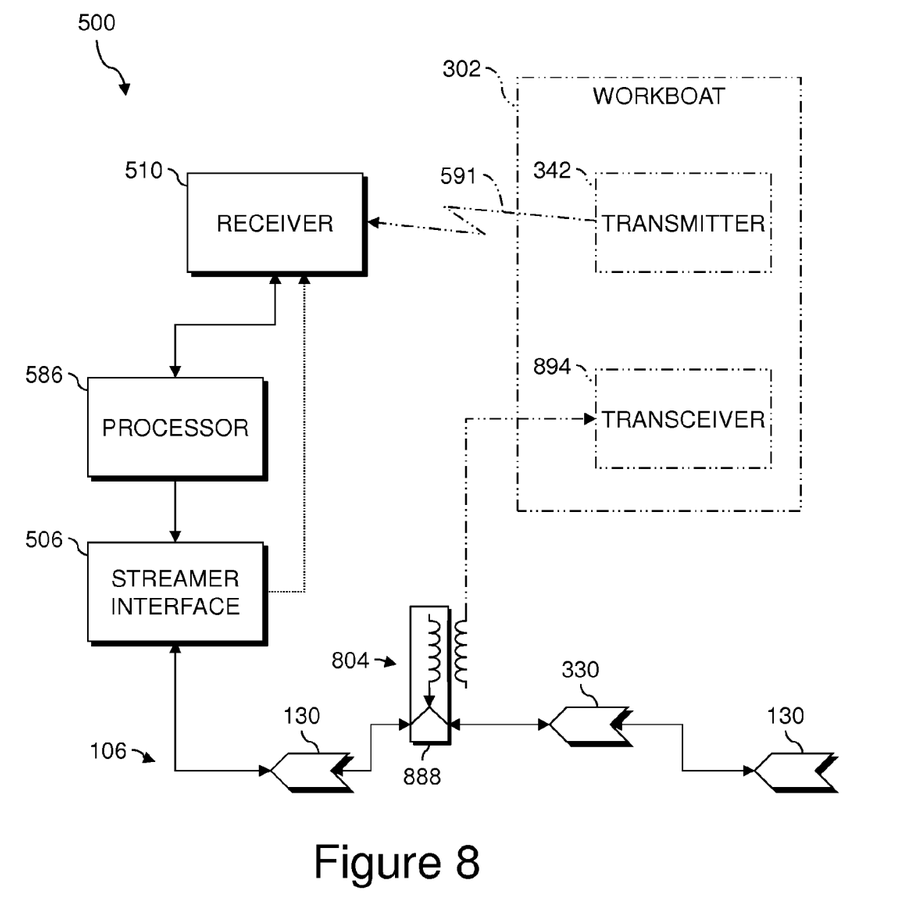
FIG. 8 is a schematic of components useful with various steps shown in FIG. 7.
Figure 9:
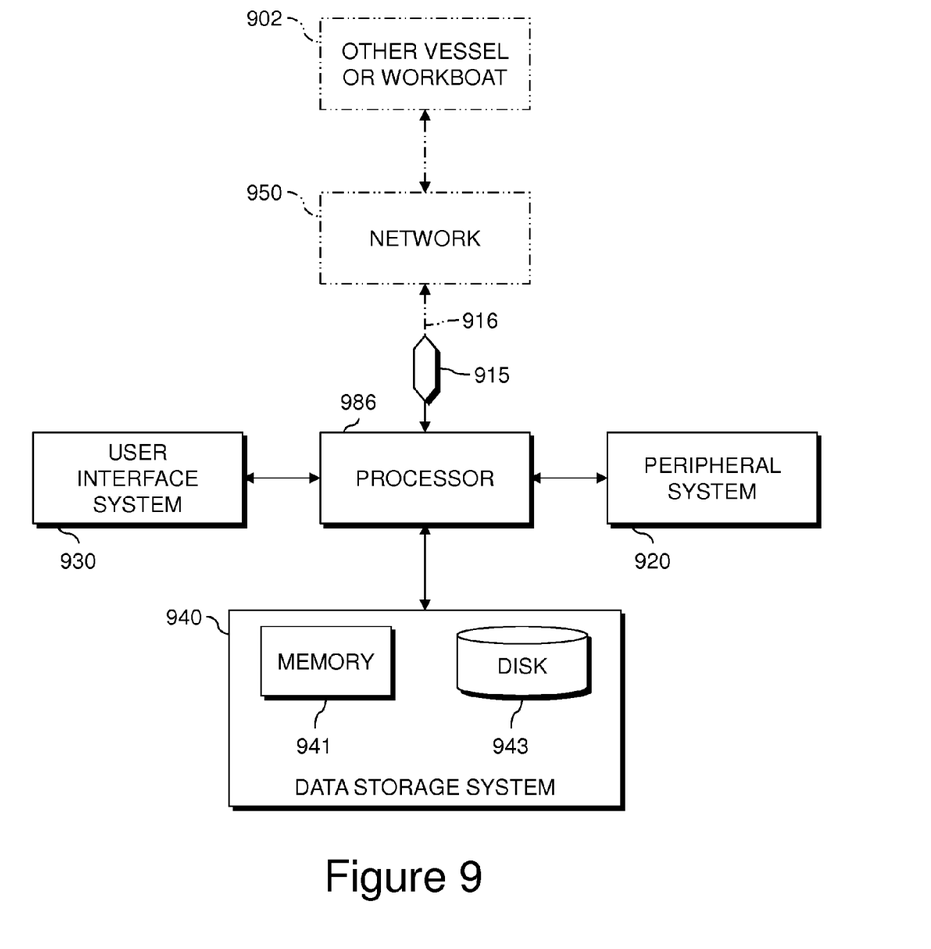
FIG. 9 is a high-level diagram showing the components of a control mechanism or other data-processing system and related components.

FIG. 4 is a flowchart illustrating exemplary methods for controlling a marine seismic streamer towed by a vessel, e.g., vessel 102, FIG. 2. The steps can be performed in any order except when otherwise specified, or when data from an earlier step is used in a later step. In various examples, processing begins with step 410. For clarity of explanation, reference is herein made to various components shown in FIGS. 1-3, 5, 6, and 8 that can carry out or participate in the steps of the exemplary method. It should be noted, however, that other components can be used; that is, exemplary method(s) shown are not limited to being carried out by the identified components. In various embodiments, the marine seismic streamer includes a cable or other support structure and one or more bird(s) attached to the cable or support structure to assist in positioning the streamer. The below-described steps can be automatically performed using a processor, e.g., processor 586 (FIG. 5), processor 686 (FIG. 6), or processor 986 (FIG. 9).

Various methods described herein permit maintenance personnel on the workboat to take partial or total control (remotely through link 320) of the streamer control system of vessel 102 so that the operator of vessel 102 cannot control the birds 130. In this way, the operator of the vessel 102 cannot accidentally instruct the birds 130 to move down or in another way that might endanger the workboat's personnel. In prior schemes, the personnel on the workboat communicate via walkie-talkie with the vessel's operator and request the operator to lock the birds. However, this places workboat personnel at risk for anything that may happen on vessel 102 to prevent the proper birds from being locked at the proper times. By permitting the workboat to control the streamer, various methods and systems herein enable personnel on the workboat to take charge of their own safety, reducing risks to those personnel from factors outside their control.

In step 410, a workboat 302 can be deployed next to a selected section of the streamer 106, e.g., portion 306 (all FIG. 2).

In step 420, at the vessel 102, a start command (entered on maintenance user interface 350 in FIG. 3) to enter a maintenance mode is received from the workboat 302 via a remote-communication link 320, FIG. 2. The start command can be provided by workboat 302 or a control system thereon in response to a press of a button 352, a touchscreen touch, or another input by a maintenance worker or other person on the workboat. In various aspects, the workboat 302 has a screen and associated maintenance user interface 350 (more details discussed with regard to maintenance user interface 350 in FIGS. 3, 6) that permit taking control of streamer 106 from the streamer control system on vessel 102. Step 420 can be followed by step 425 or step 430.

In step 425, before transmitting a locking command as discussed below with reference to step 430, at the vessel, a command to prepare for maintenance is received via a user interface. In step 427, in response to the received command, a motion command is transmitted via the data link of the streamer to direct at least a first one of the birds 330 to surface. Any number of birds can be directed to surface or to reduce depth while remaining underwater. The number of birds and their commanded depths can be selected according to the portion and length of streamer to be lifted towards the workboat 302 for maintenance. Step 427 is followed by step 430.

In step 430, in response to the received start command, a locking command is transmitted via a data link located in the streamer to direct the first one of the birds attached to the streamer to lock movable surfaces thereof, e.g., one or more wings. The locking command can be sent by the operator of vessel 102 or streamer 106, or by workboat personnel. In an aspect, the processor automatically transmits the lock command upon receiving the start command from the workboat 302. Step 430 is followed by step 432 or step 434 (either of steps 432, 434 can be performed first).

In step 430, a user interface 632 (FIG. 6) on the vessel 102 is locked so that control of one or more birds 330 is no longer available via the user interface 632. Step 430 is followed by step 432.

In step 432, the maintenance user interface 350 (FIGS. 3, 6) on the workboat 302 is enabled so that control of the one or more birds 330 is available via the maintenance user interface 350. The one or more birds 330 for which control is taken from the workboat may be defined prior to the maintenance operation, either on the vessel or from the workboat.

Once the one or more birds has been locked, and control of the birds has been moved from user interface 632 on the vessel 102 to maintenance user interface 350 on the workboat 302, maintenance can be performed on portion 306 of the streamer 106 with reduced probability of damage or injury due to unexpected motion of bird wings. The maintenance personnel maintain control over the possibility of bird motion via maintenance user interface 350. In various embodiments, step 434 is followed by steps described below with reference to FIG. 7.

As used herein, the term "lock" does not connote absolute motionlessness with respect to the body of the bird. Locked movable surfaces will not move under power. In various embodiments, locked movable surfaces also will not swing free or move a substantial distance under the influence of outside forces such as gravity.

In various aspects, when the start command is received, the processor disables the streamer control interface on vessel 102. Therefore, the operator on vessel 102 does not have control over the streamer until a stop command is received (step 440) or an emergency button is pressed (discussed below with reference to FIG. 5). In various aspects, the operator on vessel 102 still has access to a read-only interface that reports the status and position of the streamer (and other necessary information), but does not have access to buttons for controlling the streamer's birds. On a touchscreen, the buttons can be made invisible or inactive (grayed out).

Between steps 430 and 440, workboat personnel can perform maintenance while in control of the appropriate bird(s). Vessel 102 does not have control of those bird(s)

during the maintenance period. Various steps that can be performed during maintenance are described below with reference to FIG. 7.

In step 440, after transmitting the locking command, at the vessel 102, a stop command to exit the maintenance mode is received from the workboat via the remote-communication link. The stop command can be transmitted from the workboat 302 when the "stop maintenance" button 354 (FIG. 3) is pressed on maintenance user interface 350 on the workboat 302. Step 440 can be followed by step 460, or by steps 442, 444, 450 in either order.

In step 442, the maintenance user interface on the workboat is disabled. Step 444 is next. In step 444, the user interface on the vessel is unlocked.

In step 450, in response to the received stop command, an unlocking command is transmitted via the data link to direct the one or more birds to unlock the movable surfaces thereof. At this point, personnel on vessel 102 again have control of the streamer 106. In various embodiments, step 450 is followed by step 460.

In step 460, after the unlocking command is transmitted, a motion command is transmitted via the data link to direct the one or more birds 330 to change their positions.

Figure 5:
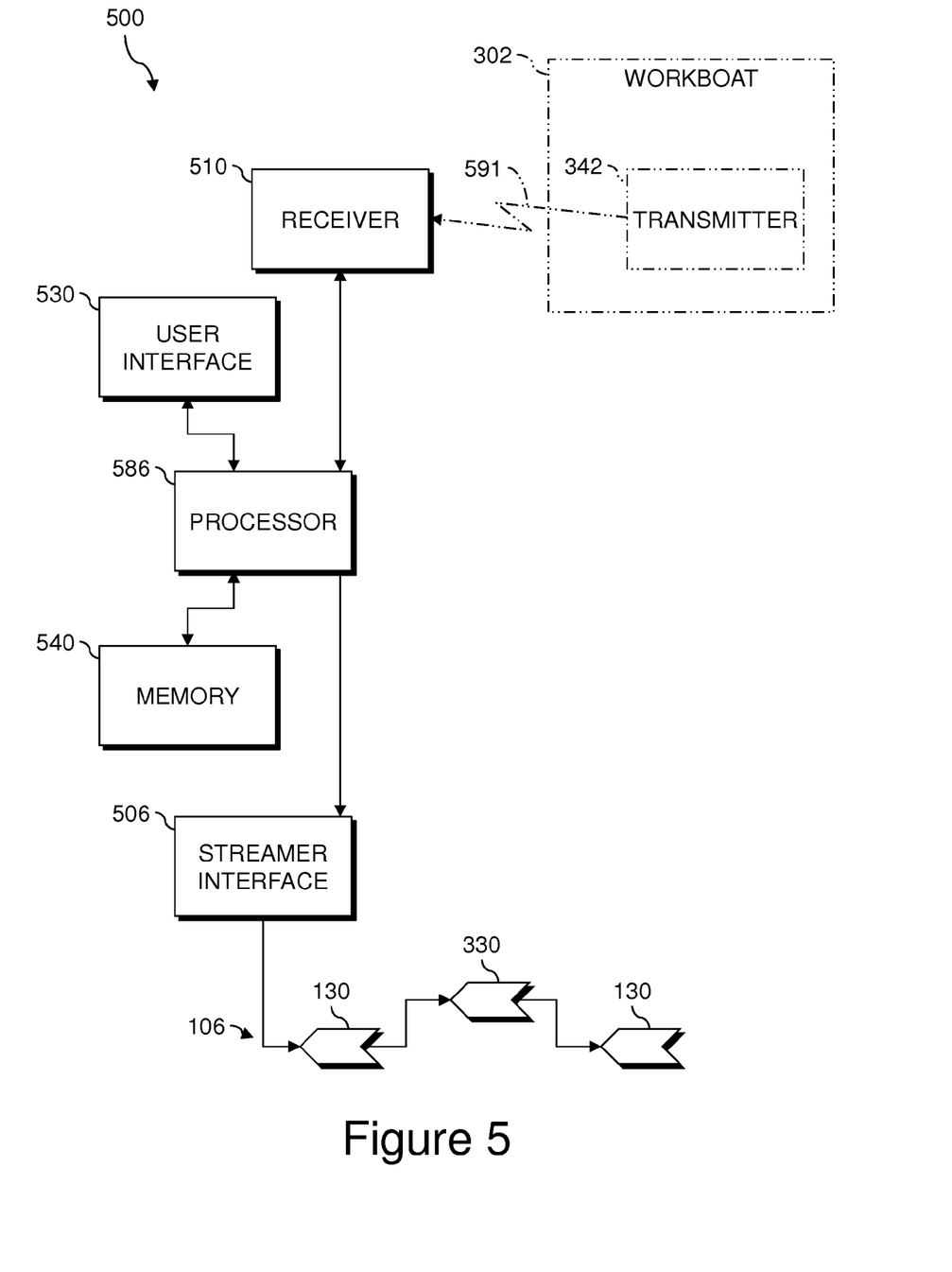
FIG. 5 shows an exemplary control apparatus for marine seismic operations, and associated components.

FIG. 5 shows an exemplary control apparatus 500 (e.g., system 103 in FIG. 2) for marine seismic operations. Control apparatus 500 can be located, e.g., on a vessel 102 towing a streamer 106 as illustrated in FIG. 2. Control apparatus 500 includes a user interface 530 configured to receive commands from an operator. Receiver 510 is configured to receive commands from a companion transmitter 342 (also called "communication device") in the marine seismic workboat 302 (both shown in phantom). In an example, receiver 510 includes a radio receiver (not shown) operative to receive commands wirelessly via wireless remote-communication link 591.

Streamer interface 506 is configured to transmit commands to one or more birds 130, 330 on streamer 106 configured to be towed by a marine seismic vessel such as vessel 102. In an example, the streamer interface is configured to transmit the commands via a signal conductor (data link) extending along the streamer. Memory 540 is configured to record locations and identifiers of the birds 130, 330 (represented graphically by elongated chevrons, as in FIG. 1). Processor 586 can update memory 540 as vessel 102 moves, if the recorded locations are absolute (e.g., latitude/longitude). Additionally or alternatively, memory 540 can be loaded with relative locations of birds 130, 330 on streamer 106 before shooting begins.

Processor 586 is connected to user interface 530, receiver 510, and streamer interface 506. Processor 586 is configured to, via user interface 530, receive an indication of a location on the streamer. The indication can include a unique identification value corresponding to a location; a latitude/longitude pair; a distance along the streamer; or another value correlated with a specific location on the streamer. The location can correspond to the location of a bird, receiver, or other active component on the streamer; or can correspond to a point on the streamer not part of an active component. Upon receipt of the indication of the location, processor 586 selects one(s) of the birds 130, 330 on the streamer 106 having recorded locations proximal to the indicated location. In this example, selected one(s) of the birds have reference number 330 and other(s) of the birds have reference number 130.

Processor 586 is further configured to, via receiver 510, receive lock or unlock commands from workboat 302 (e.g., from transmitter 342 thereon). In response to the received commands, processor 586 transmits lock or unlock commands, respectively, via streamer interface 506 to the selected one(s) of the birds 330. Processor 586 also locks or unlocks, respectively, the user interface 632 on vessel 102. In this way, as described above with reference to FIG. 4, once an operator on vessel 102 has identified the birds 330 to be moved to permit maintenance of birds 330 or streamer 106, personnel on workboat 302 can control the locking and unlocking of birds 330 without further human intervention on vessel 102.

In various aspects, processor 586 is further configured to receive motion commands from the workboat 302, e.g., via receiver 501. In response to the received motion commands, processor 586 transmits motion commands via the streamer interface 506 to one or more of the bird(s) 130, 330. In this way, personnel on workboat 302 can, without further human intervention on vessel 102, dive or surface specific birds as necessary or desired to facilitate maintenance.

In various aspects, processor 586 is responsive to a press of an emergency button on vessel 102. The operator of vessel 102 or a streamer operator located on vessel 102 can press the emergency button to take back streamer control from workboat 302 in case of emergencies. In various aspects, processor 586 transmits a notification to workboat 302 when the emergency button is pressed. The emergency button can be a physical button or a defined area on a touchscreen, and a switch or another input device can be used in place of the button.

Figure 6:
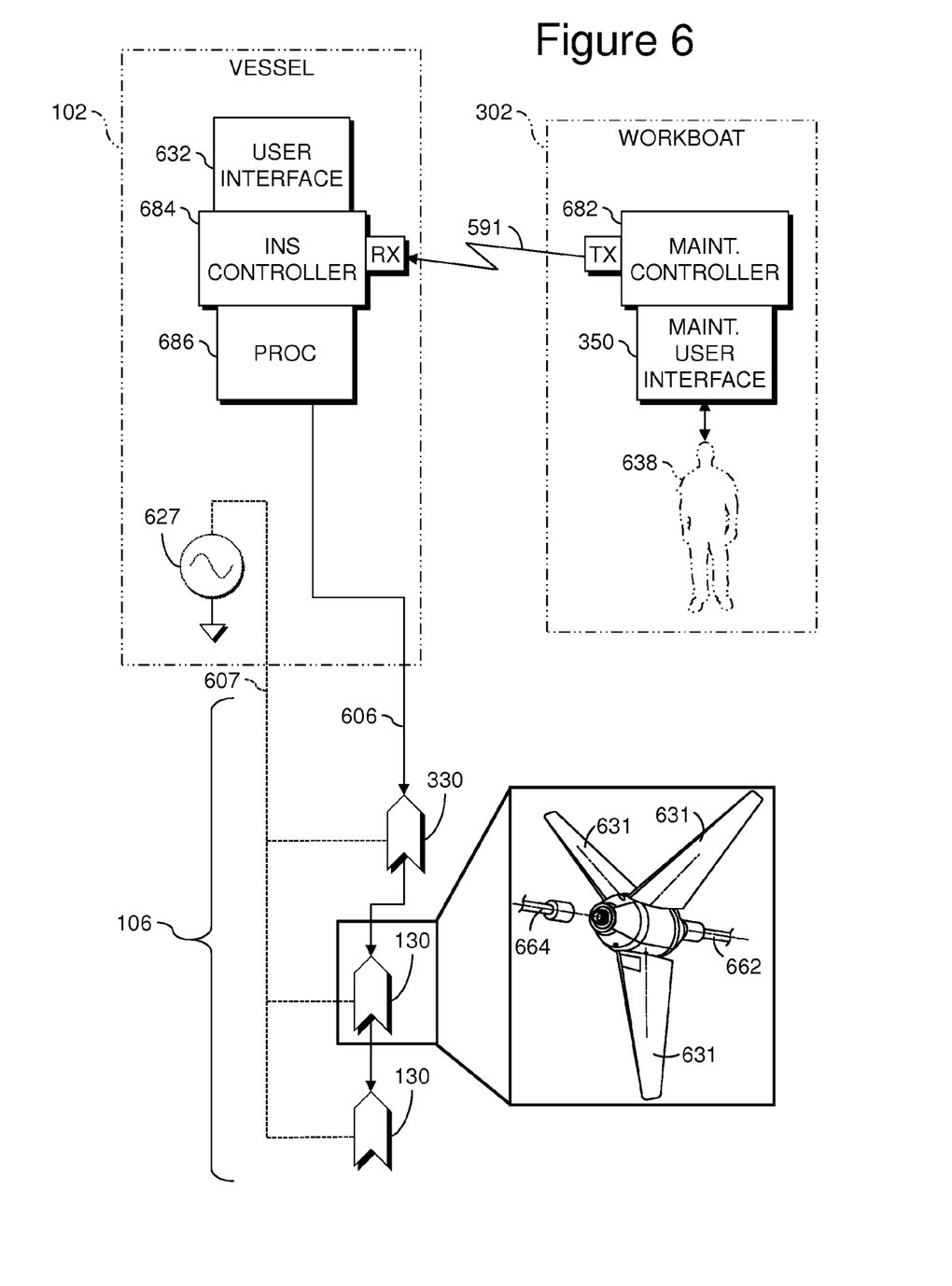
FIG. 6 is a schematic of a marine seismic detection system according to various aspects, and associated components.

FIG. 6 is a schematic of a marine seismic detection system 600 according to various aspects. Marine seismic streamer 106 is configured to be towed by a vessel 102. Streamer 106 includes a data link 606 and one or more bird(s) 130 communicatively connected to the data link 606. Each of the bird(s) 130 includes one or more movable surface(s) 631, e.g., as depicted in the exemplary perspective of a bird 130 in the inset. Bird(s) 130 are configured to assist in positioning the streamer 106. The exemplary bird 130 shown in the inset is connected to sections 662 and 664 of streamer 106.

Maintenance controller 682 is configured to be installed in a boat, e.g., workboat 302. Maintenance controller 682 includes a maintenance user interface 350 (discussed above with reference to FIG. 3) configured to (e.g., successively) receive a start-maintenance command and a stop-maintenance command, e.g., from maintenance worker 638. Maintenance controller 682 also includes a transmitter ("TX") responsive to the maintenance user interface 350 to transmit an indication of the received command via remote-communication link 591. In an example, remote-communication link 591 is a radio link and the transmitter is a radio transmitter.

Integrated navigation system (INS) controller 684 is configured to be installed in a vessel, e.g., vessel 102. INS controller 684 can include a receiver ("RX") configured to receive data via remote-communication link 591. INS controller 684 includes a processor 686 configured to automatically, in response to receipt via the remote-communication link 591 of the indication of the start-maintenance command, operate the data link 606 to direct one or more birds 330 to immobilize the movable surface(s) 603 thereof, and disable an INS user interface 632. Processor 686 is further configured to, in response to receipt via remote-communication link 591 of the indication of the stop-maintenance command, operate the data link 606 to direct the one or more birds 330 to operate the movable surface(s) 603 thereof normally, and enable an INS user interface 632. This permits remote control of locking of birds 330 from workboat 302, as described above with reference to FIG. 4.

In various aspects, INS controller 684 includes or interfaces with the INS user interface 632 on vessel 102. The INS user interface 632 can provide full control of streamer 106, including commanding birds 130, 330 or other components of streamer 106. During maintenance, the INS user interface 632 can be locked so that personnel on the vessel 102 cannot override (or cannot override without difficulty and conscious choice) control of the birds 130, 330 from the maintenance user interface 350. This was discussed above with reference to FIG. 4, steps 432, 434.

In various aspects, the maintenance user interface 350 is configured to receive a streamer motion command and transmit an indication thereof via the remote-communication link, and the INS controller is responsive to receipt via the remote-communication link of the indication of the streamer motion command to operate the data link to direct one or more of the bird(s) to move according to the indication of the streamer motion command. An example of a motion command is discussed above with reference to step 460 (FIG. 4).

In various aspects, data link 606 includes a signal conductor (represented graphically as a solid line) extending along streamer 106. Streamer 106 also includes a plurality of power conductors 607 (shown as a dashed line for clarity) extending along streamer 106. Power can be supplied to power conductors 607 by power supply 627, e.g., onboard vessel 102, which can include, e.g., an AC supply or a constant-voltage or constant-current DC supply. Bird(s) 130 are operatively connected to the signal conductor and the power conductors 607 to operate the movable surface(s) 631 in response to commands from the INS controller 684. In some examples, the signal conductor and the power conductors 607 are coupled across the first one 330 of the bird(s) 130 even while the movable surface(s) thereof are immobilized. That is, immobilizing surfaces 631 of one of the bird(s) 130 does not necessarily render that bird 130 completely deactivated or inert.

In view of the above, a technical effect is to selectively disable the ability of birds 130 to move their movable control surfaces. A further technical effect of various aspects is to present on an electronic display a visual representation of the locations or maintenance status (immobilized or not) of birds 130 on a streamer 106.

Figure 7:
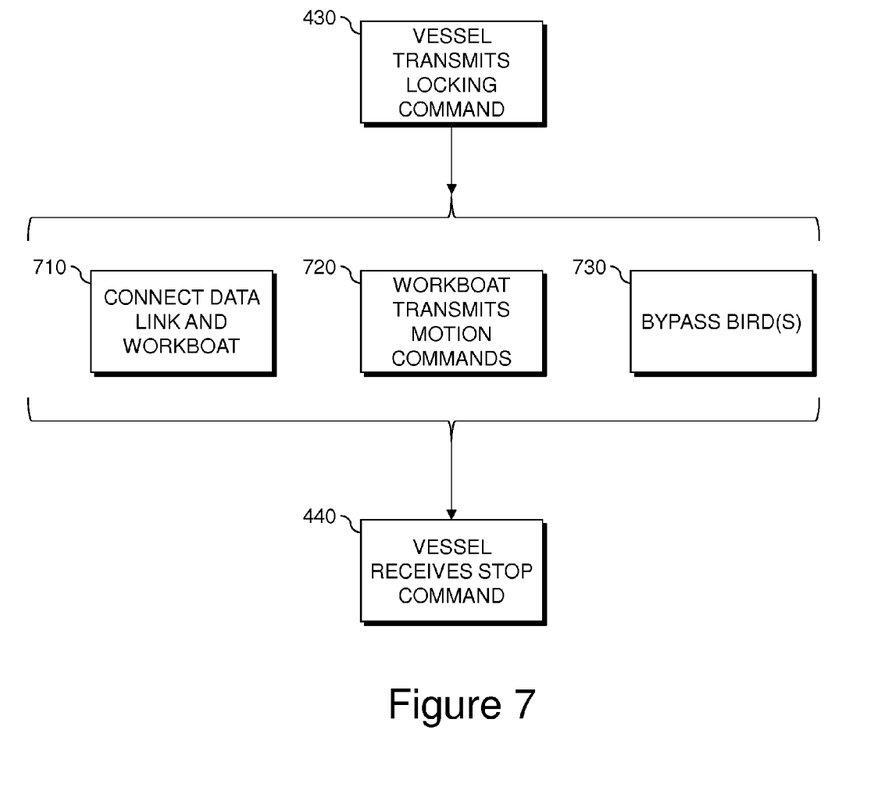
FIG. 7 is a flowchart illustrating exemplary methods for controlling a marine seismic streamer towed by a vessel during maintenance.

FIG. 7 is a flowchart illustrating various possible methods for controlling a marine seismic streamer towed by a vessel during maintenance. Between the transmission of the locking command in step 430 (FIG. 4) and the receipt of the stop command in step 440 (FIG. 4) by vessel 102 from workboat 302, any or all of steps 710, 720, 730 can be carried out in any order or combination, and any number of times. Steps 710, 720, 730 can be carried out, e.g., during the interval labeled "MAINTENANCE" on FIG. 4. For example, steps 710, 720, 730 can be performed after step 432 or step 434, since steps 430, 432, 434 can be performed in any order. For clarity, step 430 is shown as representative of steps 430, 432, 434. Steps 710, 720, 730 can be performed before step 442 or step 444, since steps 442, 444 can be perfumed in any order. For clarity, step 440 is shown as representative of steps 440, 442, 444.

In step 710, a direct connection is established between the data link in streamer 106 and workboat 302. For example, a direct or inductive connection can be used, e.g., as discussed below with reference to inductive coupling 804 (FIG. 8). Data communications as described in steps 720, 730 can then be carried out via the streamer 106. Alternatively, data communications as described in steps 720, 730 can be carried out via remote-communication link 320 (FIG. 2).

In various aspects, the workboat 302 has maintenance user interface 350 (FIGS. 3, 6) permitting more control of the streamer than "start maintenance" and "stop maintenance." For example, maintenance user interface 350 can include a screen displaying the same control options as are displayed to a streamer operator on vessel 102. This is referred to herein as a "full user interface."

In step 720, in these and other aspects, motion commands are transmitted from the workboat 302 to one or more birds 130, 330 of the streamer 106, e.g., directly or via the vessel 102. The motion commands can be provided from the workboat 302 in response to user inputs to the maintenance user interface 350. This advantageously permits workboat personnel to adjust the position of streamer 106 as may be required based on changing sea conditions or the demands of a particular maintenance job, while retaining confidence that locked birds will not move in the absence of commands from the workboat.

In step 730, one or more of the bird(s) 130, 330, e.g., the first one of the birds, is bypassed, either by remote computer command or by physical manipulation of mechanical or electrical components of the bird. Bypassing permits the workboat to control bypassed one(s) of the bird(s) 130, 330 while the vessel 102 controls the remaining birds. Various aspects including a full user interface on workboat 302 permit workboat personnel to control bypassed birds using the full user interface. Bypassed birds 130, 330 can continue to pass power and signals normally along the streamer so that vessel 102 can maintain control over portions of the streamer farther from vessel 102 than the bypassed bird(s).

FIG. 8 is a schematic of components useful with various steps shown in FIG. 7. In the example, receiver 510 is operatively coupled to streamer interface 506 to receive the lock or unlock commands via streamer 106. The coupling is shown dotted for visual clarity. In this example, workboat 302 includes transceiver 894 configured to communicate via streamer 106. For example, streamer 106 can include terminal 888 at which transceiver 894 can couple to a data link (not shown) of streamer 106. The coupling to terminal 888 can be, e.g., direct by plugging a cable into a connector, or inductive via an inductive coupling 804 on streamer 106 (as shown).

The data link is connected to streamer interface 506 so that commands from workboat 302 travel via terminal 888 into the data link of streamer 106, then to streamer interface 506, then to receiver 510, then to processor 586 (or from streamer interface 506 to processor 586 directly). Processor 586 than sends appropriate commands to bird(s) 130, 330 or other components of streamer 106 to carry out the commands from workboat 302. Communicating via streamer 106 can advantageously provide higher bandwidth or reduced noise than radio-frequency communications over a wireless remote communication link 591.

FIG. 9 is a high-level diagram showing the components of a data-processing system including a processor 986 connected to a peripheral system 920, a user interface system 930, and a data storage system 940. Processor 986 can be communicatively connected to a network 950 (shown in phantom). Devices 130, 140, 102 (FIG. 1), 103, 130, 302, 330 (FIG. 2), 340, 342, 344, 350, 352, 354 (FIG. 3), 342, 500, 506, 510, 530, 586 (FIG. 5), 627, 632, 682, 684, 686, TX, or RX (FIG. 6), or 804, 888, 894 (FIG. 8) can each include one or more of systems 986, 920, 930, 940, and can each connect to one or more network(s) 950. Processor 986 can include one or more microprocessors, microcontrollers, field-programmable gate arrays, application-specific integrated circuits, programmable logic devices (PLDs), or digital signal processors. In an aspect, systems 986, 920, 930, 940 are embodied in a computer located on one vessel 102 or workboat 302, and processor 986 is connected to a similar data processing system on another vessel 102 or workboat 302 (referred to collectively by reference number 902) via network 950 or another communications link.

In an example, data storage system 940 includes memory 941, e.g., a random-access memory (RAM), and disk 943, e.g., a tangible computer-readable storage device such as a hard drive, floppy disk, Compact Disc, DVD, read-only memory (ROM), or erasable programmable read-only memory (EPROM, EEPROM, or Flash). Computer program instructions are read into memory 941 from disk 943. Processor 986 then executes one or more sequences of the computer program instructions loaded into memory 941, as a result performing process steps described herein. In this way, processor 986 carries out a computer implemented process. For example, steps of methods described herein or blocks of the flowchart illustrations (e.g., FIGS. 4, 7) or block diagrams herein can be implemented by computer program instructions. Memory 941 can also store data, e.g., data of locations of streamer components.

The peripheral system 920 can include one or more devices configured to communicate data between the processor 986 and other systems. For example, the peripheral system 920 can receive data from receivers 140 (FIG. 1) or birds 130, 330 (FIG. 6). The processor 986, upon receipt of data from the peripheral system 920, can store such data in the data storage system 940. For example, streamer interface 506 and receiver 510 can be connected to processor 986 via peripheral system 920.

The user interface system 930 can include a mouse, a keyboard, a display 935, a touchscreen, or other devices for conveying data between the processor 986 and a user. In various embodiments, the processor 986 is further configured to present a visual representation of locations of birds 130 and status of maintenance on the display 935.

In various embodiments, processor 986 is connected to network 950 via communication interface 915 (both shown in phantom). For example, communication interface 915 can include a radio communicating via a wireless link, e.g., remote-communication link 320. Communication interface 915 sends and receives electrical, electromagnetic or optical signals that carry digital or analog data streams representing various types of information to and from network 950. Processor 986 can send messages and receive data or program code through network 950 and communication interface 915.

Various embodiments herein include computer program products having computer program instructions stored on a tangible, non-transitory computer-readable medium, e.g., disk 943. Such a medium can be manufactured as is conventional for such articles, e.g., by pressing a CD-ROM or writing a disk image to a hard drive. When the stored instructions are executed by processor 986, those instructions cause processor 986 to carry out functions, acts, or operational steps of various embodiments here, e.g., as discussed above with reference to FIGS. 4 and 7. Processor 986 can be embodied in or as processor 586 (FIG. 5), processor 686 (FIG. 6) or maintenance controller 682 (FIG. 6).

It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter may include other examples that occur to those skilled in the art. Such other examples are intended to be within the scope of the claims.

What is claimed is:

1. A method of controlling a marine seismic streamer towed by a vessel, the method comprising:
    deploying a workboat next to a selected section of the streamer;
    receiving, at the vessel, a start command to enter a maintenance mode from the workboat; and
    in response to the received start command:
        transmitting a locking command via a data link located in the streamer to direct a first one of the birds attached to the streamer to lock movable surfaces thereof; and
        locking a user interface on the vessel so that control of the first one of the birds is no longer available via the user interface.

2. The method according to claim 1, further comprising:
    enabling a maintenance user interface on the workboat so that control of the first one of the birds is available via the maintenance user interface,
    wherein the maintenance user interface communicates with the vessel via a remote communication link.

3. The method according to claim 2, further including, after transmitting the locking command:
    receiving, at the vessel, from the workboat, via the remote-communication link, a stop command to exit the maintenance mode; and
    in response to the received stop command:
        disabling the maintenance user interface on the workboat;
        unlocking the user interface on the vessel; and
        transmitting an unlocking command via the data link of the streamer to direct the first one of the birds to unlock the movable surfaces thereof.

4. The method according to claim 3, further including, after transmitting the unlocking command, transmitting a motion command via the data link to direct the first one of the birds to submerge.

5. The method according to claim 2, wherein the remote-communication link includes a wireless link outside the streamer.

6. The method according to claim 2, wherein the remote-communication link includes a wired data link inside the streamer.

7. The method according to claim 1, further including, before transmitting the locking command:
    receiving at the vessel, via the user interface, a command to prepare for maintenance; and
    in response thereto, transmitting a motion command via the data link of the streamer to direct the first one of the birds to surface.

8. The method according to claim 1, further comprising by-passing the first one of the birds so that the vessel controls the remaining birds and the workboat controls the first one of the birds.

9. A control apparatus for marine seismic operations, the control apparatus comprising:
   a user interface;
   a receiver configured to receive commands from a companion transmitter in a marine seismic workboat;
   a streamer interface configured to transmit commands to birds on a streamer configured to be towed by a marine seismic vessel;
   a memory configured to record locations and identifiers of the birds; and
   a processor configured to:
      via the user interface, receive an indication of a location on the streamer;
      select one(s) of the birds on the streamer having recorded locations proximal to the indicated location; and
      via the receiver, receive lock or unlock commands from the workboat and, in response, transmit respective lock or unlock commands via the streamer interface to the selected one(s) of the birds, and respectively lock or unlock the user interface.

10. The apparatus according to claim 9, wherein the receiver includes a radio receiver operative to receive commands wirelessly.

11. The apparatus according to claim 9, wherein the receiver communicates through a wired data link, inside the streamer, with the companion transmitter in the marine seismic workboat.

12. The apparatus according to claim 9, wherein the receiver is operatively coupled to the streamer interface to receive the lock or unlock commands via the streamer.

13. The apparatus according to claim 9, wherein the processor is further configured to receive motion commands from the workboat and, in response, transmit motion commands via the streamer interface to one or more of the bird(s).

14. The apparatus according to claim 9, wherein the streamer interface is configured to transmit the commands to the birds on the streamer via a signal conductor extending along the streamer.

15. A marine seismic detection system, comprising:
   a marine seismic streamer configured to be towed by a vessel, the streamer comprising a data link and one or more bird(s), each of the bird(s) including one or more movable surface(s) configured to assist in positioning the streamer;
   a maintenance controller configured to be installed in a workboat, the maintenance controller including a maintenance user interface configured to receive a start-maintenance command and a stop-maintenance command, and including a transmitter (TX) responsive to the maintenance user interface to transmit an indication of the received command via a remote-communication link; and
   an integrated navigation system (INS) controller configured to be installed in a vessel, the INS controller including a processor configured to automatically:
      in response to receipt of the indication of the start-maintenance command from the transmitter (TX) via the remote-communication link, operate the data link to direct a first one of the bird(s) to immobilize the movable surface(s) thereof, and disable an INS user interface; and
      in response to receipt via the remote-communication link of the indication of the stop-maintenance command, operate the data link to direct the first one of the bird(s) to operate the movable surface(s) thereof normally, and enable the INS user interface.

16. The system according to claim 15, wherein the remote communication link is a radio link and the transmitter (TX) is a radio transmitter.

17. The system according to claim 15, wherein the remote communication link is a wired link.

18. The system according to claim 17, wherein the wired link is the data link.

19. The system according to claim 15, wherein the data link includes a signal conductor extending along the streamer, the streamer includes a plurality of power conductors extending along the streamer, and the bird(s) are operatively connected to the signal conductor and the power conductors to operate the movable surface(s) in response to commands from the INS controller.

20. The system according to claim 19, wherein the signal conductor and the power conductors are coupled across the first one of the bird(s) even while the movable surface(s) thereof are immobilized.

* * * * *